US010827215B2

(12) United States Patent
Tofighbakhsh

(10) Patent No.: US 10,827,215 B2
(45) Date of Patent: Nov. 3, 2020

(54) SYSTEMS AND METHODS FOR PRODUCING PROCESSED MEDIA CONTENT

(71) Applicant: AT&T INTELLECTUAL PROPERTY I, L.P., Atlanta, GA (US)

(72) Inventor: Mostafa Tofighbakhsh, Cupertino, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/873,657

(22) Filed: Jan. 17, 2018

(65) Prior Publication Data
US 2018/0146238 A1 May 24, 2018

Related U.S. Application Data

(63) Continuation of application No. 13/624,432, filed on Sep. 21, 2012, now Pat. No. 9,906,830, which is a continuation of application No. 12/825,129, filed on Jun. 28, 2010, now Pat. No. 8,307,396.

(51) Int. Cl.
*H04N 5/445* (2011.01)
*H04N 21/433* (2011.01)
*H04N 21/2668* (2011.01)
*H04N 21/4402* (2011.01)
*H04N 21/485* (2011.01)

(52) U.S. Cl.
CPC ..... *H04N 21/4334* (2013.01); *H04N 21/2668* (2013.01); *H04N 21/440236* (2013.01); *H04N 21/485* (2013.01)

(58) Field of Classification Search
CPC ......... H04N 21/44008; H04N 21/4542; H04N 21/23424; H04N 21/44016
See application file for complete search history.

(56) References Cited

U.S. PATENT DOCUMENTS

| 6,061,056 | A | * | 5/2000 | Menard | H04N 5/4401 348/E5.108 |
| 6,295,092 | B1 | | 9/2001 | Hullinger et al. | |
| 6,311,011 | B1 | * | 10/2001 | Kuroda | G11B 27/034 386/291 |
| 6,351,596 | B1 | * | 2/2002 | Ostrover | G11B 27/034 386/241 |
| 6,493,744 | B1 | | 12/2002 | Emens et al. | |

(Continued)

FOREIGN PATENT DOCUMENTS

WO 2004034708 A1 4/2004

*Primary Examiner* — Jason Salce
(74) *Attorney, Agent, or Firm* — Guntin & Gust, PLC; Jay Anderson

(57) ABSTRACT

A method includes receiving, at a network computing device, a recording request to generate processed media content from media content. The recording request includes settings. The settings indicate to replace a particular image in the media content with a substitute image. The method includes, after receiving the media content at the network computing device via a network, generating the processed media content. Generating the processed media content includes identifying the particular image in a frame of the media content and replacing the particular image with the substitute image. The method also includes sending the processed media content via the network to a memory device.

20 Claims, 4 Drawing Sheets

(56) References Cited

U.S. PATENT DOCUMENTS

| | | |
|---|---|---|
| 7,540,009 B1 | 3/2009 | Bryant et al. |
| 7,543,325 B2 | 6/2009 | Westbrook et al. |
| 8,209,181 B2 | 6/2012 | Heckerman et al. |
| 8,619,192 B2 * | 12/2013 | Smith .................... H04N 5/445 348/461 |
| 2001/0001159 A1 * | 5/2001 | Ford ....................... H04N 7/088 725/25 |
| 2001/0046366 A1 | 11/2001 | Susskind |
| 2002/0031240 A1 * | 3/2002 | Levy ..................... G06T 1/0028 382/100 |
| 2002/0046407 A1 | 4/2002 | Franco |
| 2002/0054752 A1 | 5/2002 | Wood et al. |
| 2002/0099774 A1 * | 7/2002 | Yamato ..................... G06F 3/14 709/204 |
| 2002/0104099 A1 | 8/2002 | Novak |
| 2003/0018967 A1 | 1/2003 | Gorbatov et al. |
| 2003/0035592 A1 | 2/2003 | Cornog et al. |
| 2003/0055722 A1 * | 3/2003 | Perreault ............ G06Q 30/0215 705/14.17 |
| 2004/0049780 A1 * | 3/2004 | Gee ........................ H04N 7/088 725/32 |
| 2004/0111747 A1 | 6/2004 | Omoigui |
| 2004/0123327 A1 * | 6/2004 | Fai Ma .............. H04N 5/44513 725/100 |
| 2004/0128693 A1 | 7/2004 | Weigand |
| 2004/0168121 A1 * | 8/2004 | Matz ................ G06F 17/30867 715/255 |
| 2004/0261094 A1 | 12/2004 | Huslak et al. |
| 2005/0055716 A1 | 3/2005 | Louie et al. |
| 2005/0086688 A1 | 4/2005 | Omoigui |
| 2005/0276259 A1 | 12/2005 | Nakabayashi et al. |
| 2006/0053469 A1 | 3/2006 | Newton et al. |
| 2006/0064715 A1 * | 3/2006 | Poslinski ............. H04N 7/0887 725/28 |
| 2006/0123455 A1 | 6/2006 | Pai et al. |
| 2006/0239642 A1 * | 10/2006 | Yuasa ................. H04L 12/2805 386/286 |
| 2006/0277564 A1 | 12/2006 | Jarman |
| 2007/0008334 A1 * | 1/2007 | Takeuchi ................. G09G 3/20 345/589 |
| 2007/0157060 A1 | 7/2007 | Ganga et al. |
| 2007/0192793 A1 * | 8/2007 | Song .................. H04N 5/44543 725/39 |
| 2007/0199019 A1 | 8/2007 | Angiolillo et al. |
| 2008/0046925 A1 * | 2/2008 | Lee .................... G06F 17/30817 725/37 |
| 2008/0086754 A1 | 4/2008 | Chen et al. |
| 2008/0145025 A1 * | 6/2008 | Wimberly ......... G06F 17/30038 386/261 |
| 2008/0159533 A1 | 7/2008 | Schryer et al. |
| 2008/0201734 A1 * | 8/2008 | Lyon .................. G06Q 30/0251 725/34 |
| 2008/0222689 A1 | 9/2008 | Howcroft et al. |
| 2009/0016228 A1 * | 1/2009 | Ichiki ................ H03M 13/2909 370/241 |
| 2009/0100477 A1 | 4/2009 | Jeffs |
| 2009/0144325 A1 * | 6/2009 | Chastagnol ............ G06Q 30/06 |
| 2009/0144772 A1 * | 6/2009 | Fink ...................... G06Q 30/02 725/42 |
| 2009/0180025 A1 * | 7/2009 | Dawson ............. H04N 5/44504 348/578 |
| 2009/0182644 A1 | 7/2009 | Panagopulos et al. |
| 2009/0222853 A1 * | 9/2009 | White .................... H04N 7/163 725/34 |
| 2010/0131988 A1 | 5/2010 | Kent et al. |
| 2011/0131605 A1 | 6/2011 | Pratt et al. |
| 2011/0142422 A1 | 6/2011 | Friedman |
| 2011/0321100 A1 | 12/2011 | Tofighbakhsh |

* cited by examiner

SYSTEMS AND METHODS FOR PRODUCING PROCESSED MEDIA CONTENT

PRIORITY CLAIM

This application is a continuation of, and claims priority from, U.S. patent application Ser. No. 13/624,432, filed Sep. 21, 2012, which is a continuation of U.S. patent application Ser. No. 12/825,129, filed Jun. 28, 2010, now U.S. Pat. No. 8,307,396, each of which is hereby incorporated by reference in its entirety.

FIELD OF THE DISCLOSURE

The present disclosure is generally related to systems and methods for recording media content from a public network and producing processed media content from the media content based on user settings.

BACKGROUND

Users of public networks (e.g., the Internet) may access presentations such as lectures, seminars, simulcasts of public events, and other multimedia presentations at scheduled times. Lectures and seminars may be provided by educational institutions and companies. Public events may include simulcasts or recordings of weddings, parties, other types of celebrations, business meetings, professional or amateur sporting events, and other presentations available via the public network. Some presentations may be scheduled at overlapping times. Some users may wish to view a particular presentation more than once. Some users who record a presentation may want to make the presentation available to others. However, arranging recording of such presentations in a format that is useful may be technologically challenging for some users.

DETAILED DESCRIPTION

A network computing device may provide facilities and interfaces for users to select media content for recordation from a public network (e.g., the Internet). The users may select options for generating processed media content from the media content. The options may include adding forward error correction, transcoding the media content for playback on one or more playback devices, selection of a particular resolution for playback, altering an audio portion of the media content, altering a video portion of the media content, tagging of words and word phrases, tagging of objects, or combinations thereof. The processed media content may include error correction data, may be in a format for playback on a selected playback device, may have a desired resolution during playback on the selected playback device, may include tags at locations of selected words or word phrases in the audio portion of the processed media content, may include tags at locations of selected objects in the video portion of the processed media content, may include tags at scene transitions, may alter the audio portion of the media content, may alter the video portion of the media content, or combinations thereof.

In a particular embodiment, a method includes receiving media content at a network computing device. The media content is obtained from a media source at a scheduled time via a public network based on a user recording request received from a user device associated with a user. The method includes processing the media content to generate processed media content at the network computing device based on user settings associated with the user recording request. The method also includes storing the processed media content at a memory device identified in the user recording request.

In a particular embodiment, a system includes a network interface to communicate with a media source. The system includes a processor and a memory device accessible to the processor. The memory device includes a request module to receive a user request to record media content from the media source via a network at a scheduled time. The user request includes a plurality of user settings associated with recording the media content. The user settings include a storage location option specifying a storage location for the media content. The memory device includes an access module to access the media content at the scheduled time. The memory device includes a processing module to process the media content based on one or more of the plurality of user settings. The memory device also includes a storage module to store the processed media content at the storage location.

Figure 1:
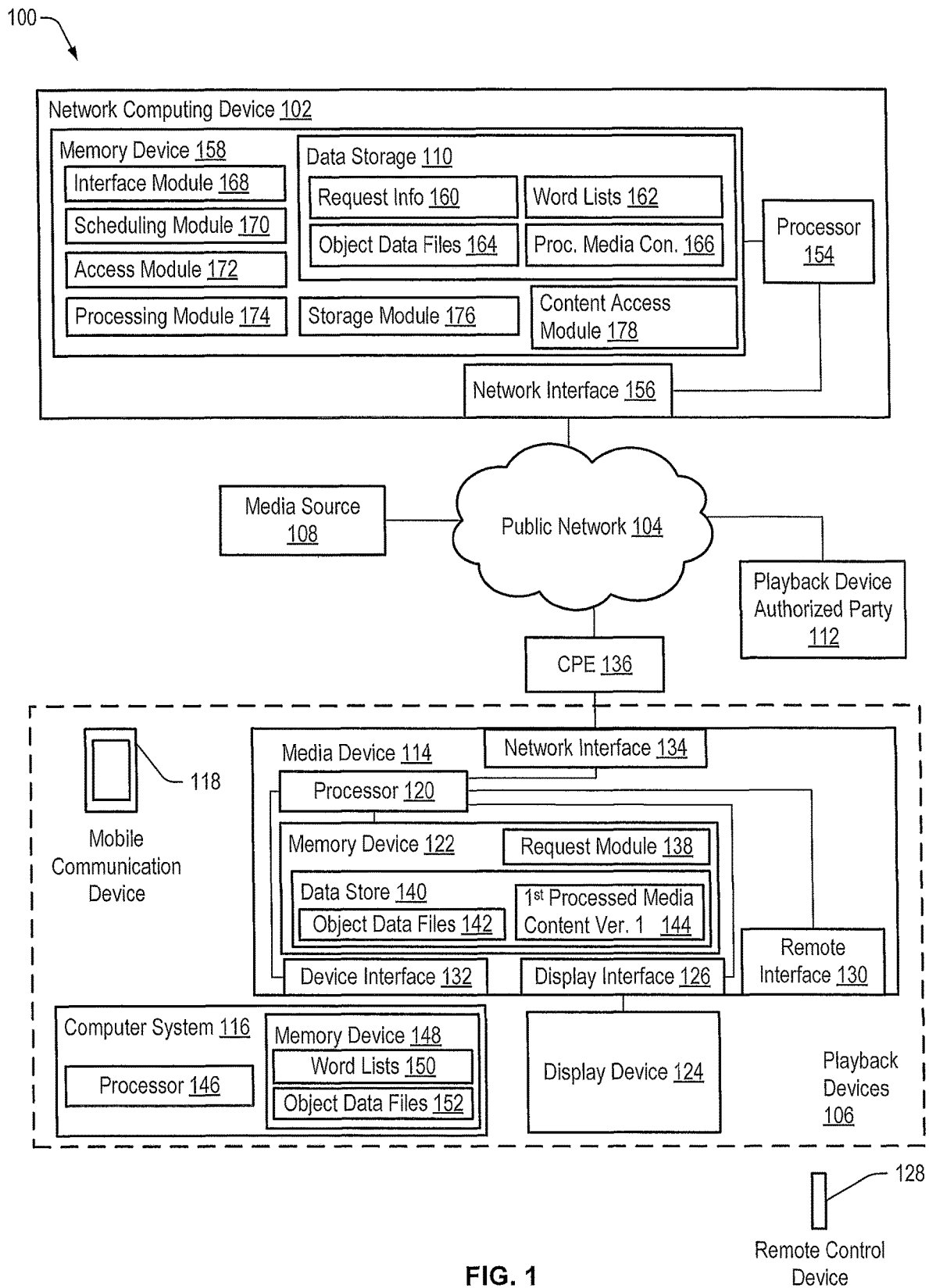
FIG. 1 is a block diagram of a particular embodiment of a system for producing processed media content.

In a particular embodiment, a non-transitory computer readable medium includes instructions executable by a processor to receive media content. The media content is obtained from a media source at a scheduled time via a public network based on a user recording request received from a user device. The non-transitory computer readable medium includes instructions executable by the processor to process the media content based on user settings associated with the user recording request. The non-transitory computer readable medium also includes instructions executable by the processor to store the processed media content at a memory device identified in the user recording request FIG. 1 is a block diagram illustrating an embodiment of a system 100 for producing processed media content. The system 100 includes a network computing device 102 that receives a request via a public network 104 (e.g., the Internet, a cellular telephone network, or other type of network) from a playback device 106 associated with a user. The request may include a request to record media content available from a media source 108 at a particular time. The network computing device 102 retrieves the requested media content at the particular time from the media source 108 and processes the media content to produce processed media content based on one or more user settings and options included in the request. The network computing device 102 stores the processed media content at a location designated in the request.

The user may view the processed media content using one or more of the playback devices 106. When the user designates that the processed media content is to be stored in a data storage 110 of the network computing device 102, and when the user authorizes the network computing device 102 to allow devices not associated with the user access to the processed media content (i.e., the processed media content is made public), a playback device 112 not associated with the user may retrieve and view the processed media content. The processed media content may be password protected or otherwise secured to inhibit viewing of the processed media content by people not authorized by the user. For example, the media content may be a wedding that is being simulcast at a particular time on a particular web site. The user may request that the network computing device 102 record the wedding using settings specified in the request to record the wedding and generate processed media content. The user may make the processed media content publicly available on the network computing device 102 to one or more playback devices 112 not associated with the user so that people who could not view the simulcast, or people who want to re-watch the wedding, can see the wedding at a later time.

The playback devices 106 associated with the user may include, but are not limited to, a media device 114 (e.g., a set-top box device), a computer system 116 (e.g., laptop computer or a desktop computer), and a mobile communication device 118. Other users may have a different number of playback devices 106, a different combination of playback devices 106, or both.

The media device 114 may include at least one processor 120 and at least one memory device 122 accessible to the at least one processor 120. The at least one processor 120 may communicate media content received from the public network 104 to a display device 124 via a display interface 126. The at least one processor 120 may communicate with a remote control device 128 via a remote interface 130. The at least one processor 120 may also communicate media content received from the public network 104 via device interface 132 to one or more other devices coupled to the media device 114. The one or more other devices may include, but are not limited to, the computer system 116 (e.g., a desktop computer system or a laptop computer system), the mobile communication device 118, or another device that is capable of communicating over a wired or wireless connection with the media device 114 via the device interface 132, the display interface 126, the remote interface 130, or a network interface 134. Some of the other devices may be able to communicate with the public network 104 without the communication passing through the media device 114. For example, the computer system 116 may be able to communicate with the public network 104 via customer premises equipment (CPE) 136 without the communication passing through the media device 114.

The media device 114 may communicate with the public network 104 via the network interface 134. The CPE 136 may facilitate communication between the network interface 134 and one or more network devices, such as the network computing device 102. The CPE 136 may include a router, a local area network device, a modem (e.g., a digital subscriber line (DSL) modem or a cable modem), a residential gateway, any other suitable device for facilitating communication between the network interface 134 and devices accessed via the public network 104, or any combination thereof.

The at least one memory device 122 may include a request module 138 and a data store 140. The request module 138 may include instructions that are executable by the at least one processor 120 to perform tasks. The request module 138 may receive an initiation request from the user to produce processed media content. The initiation request may be sent from the remote control device 128 to the media device 114. In response to the initiation request, the request module 138 may present a user interface to the display device 124. The user interface may be generated by the request module 138 or may be received from the network computing device 102.

The user populates the user interface with data that allows the network computing device 102 to generate desired processed media content. The data entered in the user interface may identify the media source 108 that provides the media content to be converted to generate the processed media content. The data entered in the user interface may identify a start time and an end time for recording the media content from the media source 108. The data entered in the user interface may identify a particular playback device of the playback devices 106 that is to be used to play the processed media content, a resolution for display of the processed media content, or both. The data entered in the user interface may identify a device where the processed media content is to be stored. The device may be one or more of the playback devices 106, the network computing device 102, or another network device. The data entered in the user interface may define selected options that the network computing device 102 will use to produce the processed media content. The data entered may identify data in the data store 140 (e.g., one or more of object data files 142 in the data store 140) or may identify data stored in another device (e.g., the computer system 116, the mobile communication device 118, the network computing device 102, or another network device). When the user is finished populating the user interface, the request module 138 may send the request to generate the processed media content request. The request may include data specifying user settings based on the user input received in the user interface. The request may be sent to the network computing device 102 via the public network 104.

The data store 140 of the media device 114 may include files used to create the processed media. For example, the data store 140 may include object data files 142 The object data files 142 may include identifying characteristics of one or more objects that are used by the network computing device 102 to identify objects in the media content. The identified one or more objects may be tagged, altered, or both when the network computing device 102 creates the processed media content from the media content. The object data files 142 may include identifying characteristics and scaling information of one or more objects that are to be substituted for other objects in the media content.

The data store 140 may also include processed media content. For example, the data store 140 may include a first processed media content file 144 that is a first version of first processed media content. The first processed media content file 144 may be viewed on the display device 124 or transferred from the media device 114 to another playback device 106 (e.g., transferred to the computer system 116).

The computer system 116 may include at least one processor 146 and at least one memory device 148 accessible to the processor 146. The at least one processor 146 may be used to initiate a request to create the processed media content. When the computer system 116 is used to initiate the request to create the processed media content, the network computing device 102 may send the user interface to the computer system 116. The user may populate the user interface with information specifying how the network computing device 102 is to create the processed media content.

The at least one memory device 148 of the computer system 116 may include files used to create processed media. For example, the at least one memory device 148 may include the word lists 150 and object data files 152. The word lists 150 may be used to identify specific words to be tagged, removed, or both in the processed media content.

The object data files 152 may include identifiers of objects to be tagged, altered, or both. The object data files 152 may include information about an object that is to be substituted for another object identified in the media content. The at least one memory device 148 of the computer system 116 may also include processed media content.

The mobile communication device 118 may also be used to initiate a request to create the processed media content. When the mobile communication device 118 is used to initiate the request to create the processed media content, the network computing device 102 may send a user interface to the mobile communication device 118. The user may populate the user interface with information specifying how the network computing device 102 is to create the processed media content.

When processed media content has been created by the network computing device 102, the user may view the processed media on a particular playback device of the playback devices 106. When the processed media is stored in a memory of the particular playback device used to view the processed media, the processed media may be retrieved from the memory and sent to a display device of the particular playback device. When the processed media is stored in the network computing device 102 or another network device, the processed media may be transferred to the memory of the particular playback device or the processed media may be streamed to the particular device for viewing.

When the user views the processed media content, the user may manipulate controls of the particular playback device of the playback devices 106 to access features included in the processed media content. For example, when the particular playback device is the media device 114, the user may activate a particular button of the remote control device 128 to display on the display device 124 a listing of the different tags in the processed media content. The user may further use the remote control device 128 to select a particular tag. When the particular tag is selected, the processed media content is forwarded to the next location where the particular tag occurs. Similarly, the user may manipulate a touch screen, number pad, keyboard, mouse, or other access device of the computer system 116 or of the mobile communication device 118 when using those particular playback devices to view processed media content.

The network computing device 102 may be used to create the processed media content. The network computing device 102 may include at least one processor 154, a network interface 156 in communication with the at least one processor 154, and at least one memory device 158 accessible by the at least one processor 154. The at least one processor 154 may execute instructions to complete tasks. The network interface 156 may facilitate communications via the public network 104 with playback devices 106, 112; with the media source 108; with the CPE 136; other network devices; or combinations thereof.

The memory device 158 may include data storage 110. The data storage 110 may include request information 160, one or more word lists 162, one or more object data files 164, one or more versions of processed media content 166, or combinations thereof. The request information 160 may include information received in requests to create processed media content. The request information 160 for a particular request may include user specified options used to create the processed media content.

The one or more word lists 162 may include list words or word phrases to be identified during generation of the processed media content. For example, the one or more word lists 162 may list expletives or other offensive terms. The request information 160 for a particular request may specify use of a particular word list 162. During processing of the media content, the at least one processor 154 may identify locations in an audio portion of the media content of occurrences of words or word phrases in the particular word list 162. Depending on user selected options in the request information 160, the locations may be tagged, the words or word phrases may be replaced with substitute audio, or both in the processed media content.

The one or more object data files 164 may include files of information used to identify standard objects or people within the media content being processed. For example, the one or more object data files 164 may contain information that may be used to identify particular models of cars, particular types of balls (e.g., soccer balls), particular types of plants or trees, particular type of appliances, and famous people. In another example, the one or more object data files 164 may contain face recognition information. The request information 160 for a particular request may specify one or more particular object data files 164 to be used during processing of the media content. The at least one processor 154 may identify locations in a video portion of the media content of occurrences of objects identified by the particular object data files 164. Depending on user selected options in the request information 160, the locations may be tagged, the objects may be altered, or both in the processed media content.

The versions of processed media content 166 may include processed media content designated in the request information 160 to be stored in the network computing device 102. The request information 160 used to generate the versions of processed media content 166 may specify that the processed media content is private for retrieval by one or more of the playback devices 106. The request information 160 used to generate the versions of processed media content 166 may specify that the processed media content is to be public. A public version of processed media content 166 may be retrieved by one or more of the playback devices 106, as well as by playback devices 112 not associated with the user.

The memory device 158 may include a plurality of modules. The modules may include instructions that are executable by the at least one processor 154. The plurality of modules may include, but is not limited to, an interface module 168, a scheduling module 170, a processing module 174, a storage module 176, and an access module 178.

Figure 3:
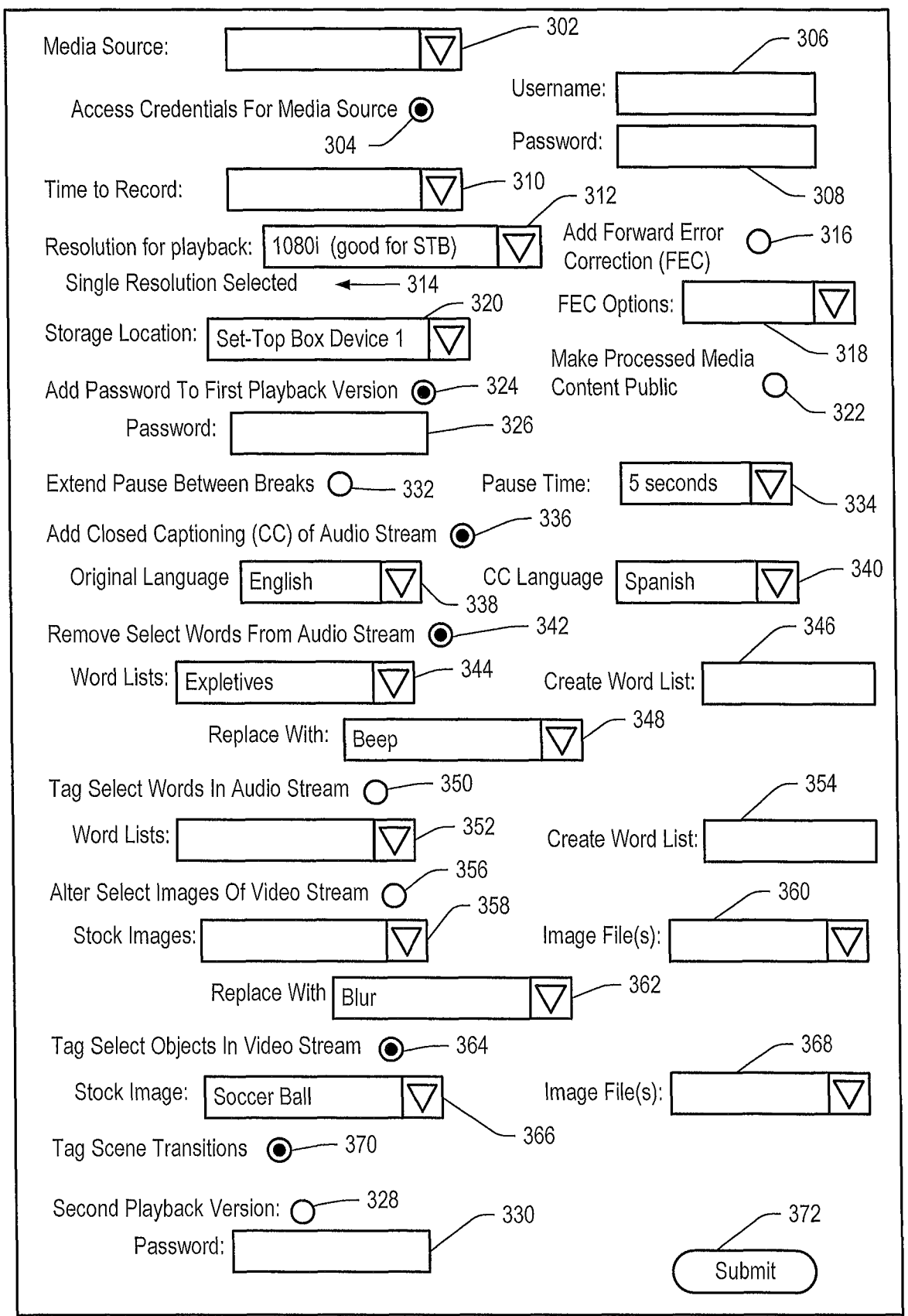
FIG. 3 is a representation of a particular embodiment of a portion of a user interface for entering information and user settings used for producing processed media content.

The user may send a command to a particular playback device of the playback devices 106 to begin the process of creating the processed media content. In response to the command, a user interface may be presented to the user. The user may enter user input into the user interface to specify parameters to be used to generate the processed media content. When the particular playback device is able to generate the user interface, the particular playback device may generate and present the user interface to the user. When the particular playback device is not able to generate the user interface, an initiation request may be sent from the particular playback device to the network computing device 102. The initiation request may be received by the at least one processor 154. In response to the initiation request, the at least one processor 154 may execute the instructions of the interface module 168. The interface module 168 may determine what playback device type sent the initiation request. The interface module 168 may create a user interface usable by the particular playback device based on the playback device type determination. The user interface may include inputs to receive information concerning the media content to be recorded and inputs to receive options used to create the processed media content. The user interface for one type of playback device (e.g., the media device 114) may not be usable by a different playback device (e.g., the mobile communication device 118). The interface module 168 may send the user interface to the particular playback device that sent the initiation request. FIG. 3 depicts a particular embodiment of a user interface sent to a particular playback device.

The user may provide information about the media content to be recorded and processed and selected options for processing media content using the particular playback device. The user may send the information to the network computing device 102 as a recording request. When the at least one processor 154 receives the recording request, the at least one processor 154 may execute the instructions of the scheduling module 170. The scheduling module 170 may check that the recording request contains all needed information and may check that a scheduled time for recording the media content is viable. When the scheduling module 170 determines that the recording request is not valid, the scheduling module may send a notification to the particular playback device that the recording request is not valid. The notification may include entries for information needed to make the recording request valid. In response to the notification, the particular playback device may resend the recording request to the network computing device 102. When the scheduling module 170 determines that the recording request is valid, the scheduling module 170 may send an acknowledgement to the particular playback device that the recording request was received and will be processed at the scheduled time. The scheduling module 170 may schedule the at least one processor 154 to retrieve the media content from the media source 108 at the scheduled time. The scheduling module 170 may store information from the request needed to generate the processed media content in the request information 160 of the data storage 110.

At the scheduled time, the at least one processor 154 may execute the instructions of the access module 172. The access module 172 may access the media source 108 via the public network 104 to retrieve the media content.

The at least one processor 154 may execute the instructions of the processing module 174 to generate the processed media content. The processing module 174 may retrieve the request information 160 from the recording request from the data storage 110. The processing module 174 may alter the media content according to options specified in the request information 160. The options may include, but are not limited to, setting a resolution of the processed media content, adding forward error correction to the processed media content, designating when handoffs are to occur when the processed media content is wirelessly transmitted via a telecommunication network, adding one or more passwords to the processed media content, adding extended pauses between breaks in the processed media content, adding closed captioning of the audio stream to the processed media content, modifying the audio stream of the processed media content, modifying the video stream of the processed media content, tagging scene transitions, or combinations thereof.

When the request information 160 includes the option to add closed captioning to the processed media content, the request information 160 may specify an original language of the audio portion and a closed captioning language. The processing module 174 may perform a textual transcription of the audio data of the media content in the designated original language. When the original language is the same as the closed captioning language, the result of the textual transcription is added by the processing module 174 to the processed media content. When the closed captioning language is different from the original language, the results of the textual transcription of the audio data may be passed through a translation program to produce a transcription of the audio portion in the designated closed captioning language. The processing module 174 adds the transcription in the designated closed captioning language to the processed media content.

The textual transcription of the audio portion of the media content may also be generated by the processing module 174 when the request information 160 indicates that selected portions of the audio data are to be tagged, replaced with substitute audio data, or both. For example, each occurrence of a word or word phrase in a word set may be tagged, modified, or both. The word set may include a selected word, selected words, a selected word phrase, selected word phrases, or combinations thereof. The word set may be identified in the request, in the one or more word lists 150, 162, or both. Locations of the selected portions of the audio data may be identified by searching the result of the textual transcription for occurrences of members of the word set and phonetic equivalents. The locations in the audio stream corresponding to the locations in the textual transcription of starts and ends of members of the word set may be identified and tagged. A tag may be unique to a particular word or word phrase. The tag may indicate from what source the word or word phrase was obtained (e.g., from a portion of the request, from the word lists 150, from the word lists 162, or from another source). The tag may also indicate whether the tag is for the start or end of the particular word or word phrase. In embodiments where the word or word phrase is not to be replaced with substitute audio, an end location of the word or word phrase may not be tagged. The tags in the processed media content may allow a particular playback device to quickly go to portions of the processed media content that are of interest to a viewer of the processed media content.

The processing module 174 may remove or modify audio associated with selected words or word phrases of the word sets specified in the request information 160. For example, the processing module 174 may insert substitute audio data to replace removed portions of the audio. The substitute audio data may be adjusted to last as long as the removed portions, to have the substantially the same emphasis (e.g., volume, pitch, tone, or combinations thereof) as the removed portions, or both.

The processing module 174 may analyze the video portion of the media content to identify one or more objects designated in the request information 160. The one or more objects may be inanimate objects, animals, people, or other types of objects. The objects may be specified by information in the one or more object data files 142, 164 designated in the recording request. The processing module 174 may search the media content for occurrences of the objects. When a particular object is detected at a particular frame, preceding video frames and subsequent video frames may be analyzed by the processing module 174 to determine an initial frame when the particular object first appeared and a last frame before the particular object does not appear. The initial frame and the last frame may be tagged by the processing module 174. This process may be repeated for each separate occurrence of the selected object in the media content. When the request information 160 does not specify that a substitute image is to be used to replace the particular object, the processing module 174 may not tag the last frame of the occurrence of the particular object. Initial frame tags for objects specified in the request information 160 may be used by viewers of the processed media content to rapidly go to locations of interest in the processed media content.

The request information 160 may specify that one or more objects in the video stream are to be replaced. For a particular specified object, the replacement may be made by altering the specified image in each frame that contains the specified object or by replacing the specified image with a substitute object. The alteration may blur or otherwise alter the specified object. The substitute object may be inserted in each frame in place of the specified object. The substitute object may be identified in a particular file in the request information 160. The particular file may include information that allows the processing module 174 to adjust the substitute object for perspective changes, rotational changes, other image adjustments, and combinations thereof that occur in the frames that include the specified object.

The processing module 174 may analyze the video portion of the media content to identify scene changes when the request information 160 indicates that the user wants scene changes tagged. A scene change may be identified when at least a threshold percentage of a frame is different than a preceding frame. Tags may be inserted in the processed media content by the processing module 174 to identify the scene changes. An example of a scene change is when a view of the media content switches from an orator of a lecture to a visual presentation displayed by the orator. Tagging scene changes may allow the viewer of the processed media content to quickly scan through the processed media content to find scenes of interest to the viewer.

The processing module 174 may generate more than one version of the processed media content. For example, the request may designate that a first version of the processed media content for the mobile communication device 118 be generated and stored in the processed media content 166 of the data storage 110. The request may also designate that a second version of the processed media content for the media device 114 be generated and stored in the data store 140 of the media device 114. The request may also designate that a third version of the processed media content be generated and made public on the network computing device 102 or another network device so that the playback device 112 not associated with the user may have access to the processed media content. Each version of the processed media content may be generated with different options that are specified in the request.

The processing module 174 may generate processed media content that has different versions within the processed media content. The version that a viewer sees may be dependent on a password or other user credentials used to access the content of the processed media content. When the viewer enters a first user credential, the version of the processed media content presented to the viewer may be in a first form that includes certain options. When the viewer enters a second user credential, the version of the processed media content presented to the viewer may be in a second form that includes certain options that differ from the options of the first form. The first form may be the media content without any filters applied to the media content. The second form may have one or more filters applied to the media content to remove certain content (e.g., a first filter may remove expletives or other objectionable language and a second filter may remove selected objects). For example, an amateur sporting event is sent from a video camera to the Internet at a scheduled time. Members of a viewing crowd or participants involved in the sporting event may use expletives or other words inappropriate for children or others. In addition, an operator of the camera may occasionally change the view of the camera from the sporting event to the audience or other subject matter. The user who records the media content of the amateur sporting event may send the request for recording the amateur sporting event to the network computing device 102. The request may include an option to tag occurrences of an object used in the amateur sporting event (e.g., a game ball). The request may identify a first user credential that allows people who enter the first user credential to view a first playback version of the amateur sporting event without any modification of the audio of the amateur sporting event. The request may also identify a second user credential that allows people who enter the second user credential to view a second playback version of the amateur sporting event with a beep substituted for detected expletives in the audio portion. Both versions in the processed media content may provide access to the tags of the object so that viewers of the processed media content can forward to portions of the media content that involve the sporting event as indicated by the presence of the object.

The at least one processor 154 may execute the instructions of the storage module 176 to store the processed media content created by the processing module 174. The processed media content may be stored at a location or locations specified in the request information 160.

The network computing device 102 may receive a request to access the processed media content. The at least one processor 154 may execute the instructions of the content access module 178 to determine whether to send the processed media content to a requestor. When the content access module 178 determines that a particular playback device that sent the request for the processed media content is associated with the user, the content access module 178 may send the processed media content to the particular playback device. When the content access module 178 determines that the playback device that sent the request for the processed media content is not associated with the user, the content access module 178 may check to see if the processed media content has been made public by the user and may require additional verification from the requestor (e.g., entry of a password to access content of a particular version of the processed media content 166). The content access module 178 may not send the processed media content to the playback device when the processed media content has not been made public by the user. The content access module 178 sends the requested processed media content when the processed media content has been made public by the user.

Figure 2:
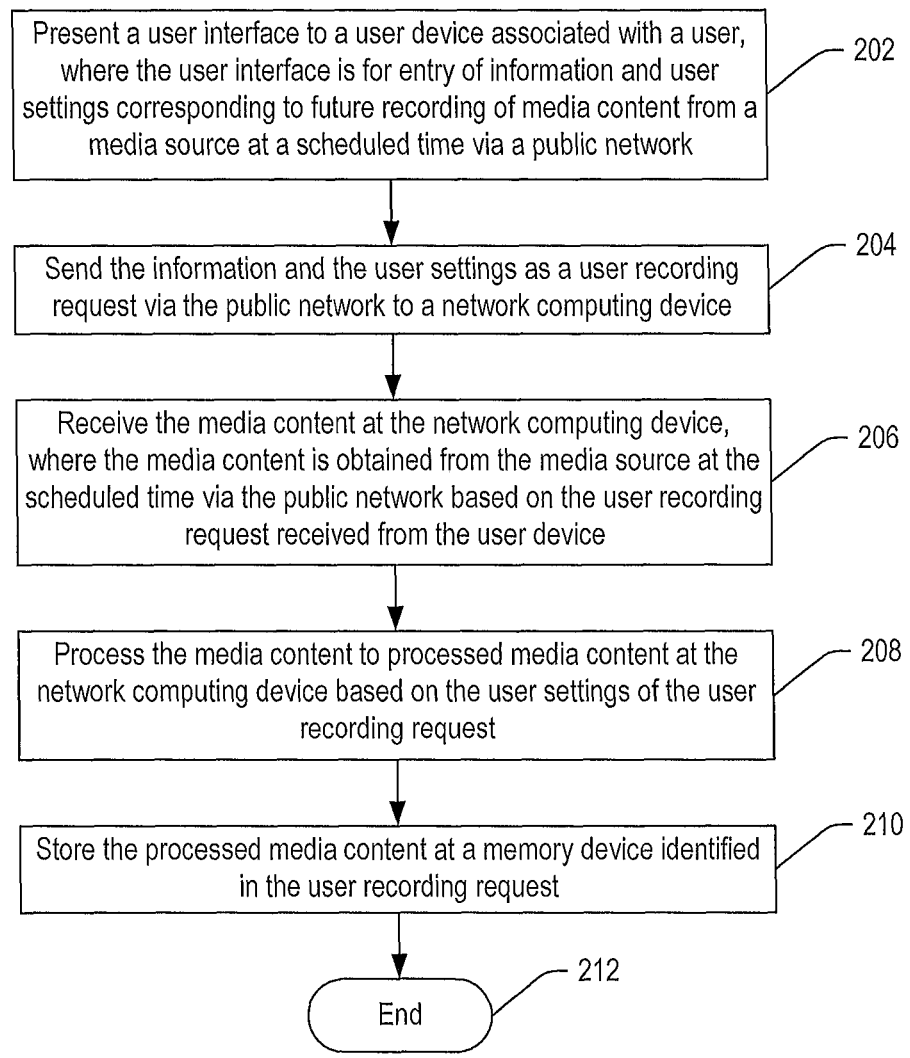
FIG. 2 is a flow chart of a particular embodiment of a method for producing processed media content.

FIG. 2 is a flow diagram of a particular embodiment of a method to produce processed media content. At 202, a user interface is presented to a user device associated with a user. The user interface is for entry of information and user settings corresponding to future recording of media content from a media source at a scheduled time via a public network. The user device may be one of the playback devices 106 depicted in FIG. 1. At 204, the user settings and the information are sent as a user recording request via the public network to a network computing device. The network computing device may be the network computing device 102 depicted in FIG. 1.

At 206, the network computing device receives the media content. The media content is obtained from the media source at the scheduled time via the public network based on the user recording request received from the user device. The media content is processed to generate processed media content at the network computing device based on the user settings of the user recording request, at 208. The processed media content is stored at a memory device identified in the user recording request, at 210. The method ends at 212.

FIG. 3 is a representation of a particular embodiment of a portion of a user interface 300 for entering information and user settings used for producing processed media content. The information may be data used by a network computing device (e.g., the network computing device 102 depicted in FIG. 1) to identify and retrieve media content to be recorded. The user settings may include data used by the network computing device to produce the processed media content.

The user interface 300 may include a plurality of user selectable input options. The user selectable input options may include any combination of input options, such as text entry boxes, pull down menus, radio buttons, check boxes, or other selectable input options. For example, the user interface 300 may include a media source option 302 for entering an identifier of a media source which is to provide the media content to be recorded. Selection of an arrow of the media source option 302 may display identifiers of previously used media sources.

The user interface 300 may include a credentials option 304. Selection of the credentials option 304 may indicate that access credentials are needed to retrieve the media content from the media source. Selection of the of the credentials option 304 may cause a username option 306 and a password option 308 to be accessible in the user interface 300. In other embodiments, entries for different types of user credentials may appear in addition to or in lieu of the username option 306 and the password option 308. In some embodiments, the entries for user credentials may be present in the user interface 300 but inaccessible until the credentials option 304 is selected.

The user interface 300 may include a recording time option 310 for entry of a date and time when the media content is to be presented by the media source. Selection of an arrow of the recording time option 310 may present a graphic that facilitates selection of the desired date and time.

The user interface 300 may include a resolution option 312. Selection of an arrow of the resolution option 312 may present a listing of available resolutions. The resolutions may include information that informs a user that the resolution is appropriate for certain playback devices. The resolution option 312 may allow the user to select more than one resolution. An entry message 314 may display whether the user has selected a single resolution or multiple resolutions. When multiple resolutions are selected, a separate processed media content may be created for each of the selected resolutions. In some embodiments, the user interface 300 may include an option to select a particular device for playback of the processed media content. When the user selects the particular device, the user interface 300 may present automatically selected entries for certain options that pertain to the particular playback device. The user may accept or change the automatically selected entries.

When a user selects a resolution or resolutions from the resolution option 312, the user interface may present options for the selected resolutions. The options may include, but are not limited to, options related to adding forward error correction (FEC), options related to handling when handoffs from one transmitter to another are allowed for mobile communication devices, and combinations thereof. The options related to handling when handoffs from one transmitter to another are allowed may specify that handoff from a first transmitter to a second transmitter that provides a stronger signal is allowed after transmission of packets related to an object are sent instead of handing off when the second signal is detected. Handing off after transmission of the packets related to the object may avoid loss of data packets for the object that could occur during handoff. The options may be automatically populated with recommended entries based on the selected resolution. For example, when the user selects a resolution that is good for a set-top box device, the user interface 300 may present a forward error correction (FEC) option 316 that is not selected. When the user selects a resolution that appropriate for a mobile communication device, the user interface 300 may present a forward error correction (FEC) option 316. The FEC option 316 may be automatically selected when the selected resolution indicates the processed media content may be used by a playback device that may be subject to data loss during delivery of the processed media to the playback device (e.g., a mobile device or a laptop computer) or when the user has previously opted to apply FEC for the selected device. The user of the user interface 300 may change the automatically selected entry. In addition to the FEC option 316, the user interface 300 may present a FEC options option 318 that allows selection of different types of FEC, different levels of FEC, or combinations thereof.

The user interface 300 may include a storage location option 320. The storage location option 320 may allow a user to select a location for storage of processed media content. The user interface 300 may enable the selection of more than one location for storage of the processed media content. Selection of an arrow of the device type option 320 may present a listing of selectable storage locations. The storage locations may include, but are not limited to, media devices (e.g., set-top box devices) associated with the user, computer systems associated with the user, and network devices. Network devices may be selected by the user to allow the user to have access to the processed media via a mobile communication device with limited memory capacity. Storage of the processed media content on a network device may allow the user to grant access to the processed media content to at least one other person. The user interface 300 may include a public option 322 when the storage location has the ability to allow access to the processed media content to others in addition to the user. When the public option 322 is selected, the processed media content may be available to others in addition to the user.

When the user selected multiple resolutions via the resolution option 312, storage options may be presented for each chosen resolution. The user interface 300 may also allow the user to select a name to be associated with each instance of the processed media content to be created.

The user interface 300 may include options to specify generation of more than one version of the processed media content. For example, the user interface 300 may include options 324, 326, and 332-370 to generate a first playback version of the processed media content. The user interface 300 may include a first playback version password option 324. Selection of a first playback version password option 324 may enable a password to be applied to a first version of the processed media content. Selection of the first playback version password option 324 may cause presentation of a first version password option 326. The user may enter a password for the first version into the first version password option 326. When the processed media is created, the password entered in the first version password option 326 will be required to be entered before the contents of the first version of the processed media file are accessible.

When a second version option 328 is selected, the first playback version password option 324 may be automatically selected, and an entry in the first version password option 326 may be required. A different entry in a second password option 330 may also be required. Selection of the second version option 328 may cause the user interface 300 to present options to specify generation of a second version of the processed media content. Selection of the second version option 328 may cause the user interface 300 to present a third playback version option and options for generation of a third version of the processed media content. Additional playback version options and options for generation of additional versions of the processed media content may also be presented via the user interface 300.

The user interface 300 may include a break option 332. When selected, the break option 332 may cause the processed media to have an extended pause at breaks in oration. The pause may be placed at the end of sentences and other natural breaks in the oration. Placing extended breaks may have applicability for students taking notes from the processed media content when the media content is a lecture by a professor, teacher, or guest speaker. When the break option 332 is selected, a pause time option 334 may enable entry of added time for the pauses. When the break option 332 is not selected (e.g., as depicted in FIG. 3), the pause time option 334 may not be presented or may not be selectable by the user.

The user interface 300 may include a closed captioning (CC) option 336. Selection of the closed captioning option 336 may allow a closed captioning stream of oration in the media content to be presented in the processed media content. Selection of the closed captioning option 336 may cause presentation of an original language option 338. The user may select the primary language of the oration of the media content in the original language option 338. Selection of an arrow of the original language option 338 may present a list of available languages. The user interface 300 may automatically populate the selected entry in a CC language option 340. The user may type in a different entry or use an arrow to present a list of available languages in the CC language option 340. The processed media will include closed captioning of the oration in the media content in the language selected in the CC language option 340. The user interface 300 may also present additional options to control where a CC stream is presented in the processed media. For example, the user interface may include an option that is selectable to enable placement of the CC stream at a bottom of the processed media, at a top of the processed media, at a different location, or as a separate window of the processed media.

The user interface 300 may include a remove select words option 342. Selection of the remove select words option 342 may cause the user interface 300 to present a word list option 344, a create word list entry 346, and a replacement option 348. In some embodiments, the word list option 344, the create word list entry 346, and the replacement option 348 are not present or not accessible when the remove select words option 342 is not selected.

The word list option 344 allows the user to enter the location of a file that has a list of words, words combinations, or both that are to be removed from the media content when the processed media content is created. Selection of an arrow of the word list option 344 may present previously used word lists and known word lists. For example, one of the known word lists may be a common expletives list that is stored at a network device (e.g., in the word lists 162 of the network computing device 102 depicted in FIG. 1). Removal of expletives from the media content may make the media content more presentable for certain audiences (e.g., for audiences that may include children).

The create word list entry 346 may allow the user to create or add words or word phrases that are to be removed from the media content to a user defined word list. In some embodiments, the user defined word list may contain a single word or a single word phrase. The user interface 300 or a separate editor may allow the user defined word list to be edited.

The replacement option 348 may allow the user to select what sound is to replace the removed words in the processed media content. Selecting an arrow of the replacement option 348 may present different options for the replacement sound. The replacement sound may be, but is not limited to, a beep, silence, or the contents of a user selected audio file.

The user interface 300 may include a tag select words option 350. Selection of the tag select words option 350 may cause the user interface 300 to present and make accessible a word list option 352 and a create word list entry 354. Selection of the tag select words option 350 causes a tag to be placed in an audio portion of the processed media content at each location of words or word phrases identified in a word list obtained from the word list option 352 or from words or word phrases entered in the create word list entry 354. In some embodiments, only a single word or a single word phrase may be identified in a word list selected from the word list option 352 or entered in the create word list entry 354. When more than one word, word phrase, or combination thereof is identified to be tagged, the processed media content may contain a unique tag for each identified word or word phrase. The unique tags may allow a playback device to quickly go to occurrences in the processed media content where a specific identified word or word phrase appears in the audio portion of the media content.

The user interface 300 may include an alter select images option 356. Selection of the alter select images option 356 may cause the user interface 300 to present a stock images option 358, an image file option 360, and a replacement option 362. In some embodiments, the stock images option 358, the image file option 360, and the replacement option 362 are not present or not accessible when the alter select images 356 is not selected.

The stock images option 358 allows the user to select an object from a list of objects. For example, the common objects may include, but are not limited to, particular models of cars, particular types of balls (e.g., soccer balls), particular types of plants or trees, and particular type of appliances. The stock images option 358 may allow the user to select more than one entry from the list. The stock images option 358 may be blank until a user selects an entry from the list. When the user selects a single object, the processed media will contain an image designated in the replacement option 362 for each occurrence of the selected common object. When the user selects more than one object from the list presented by the stock images option 358, the user may be prompted to enter a particular replacement image in the replacement option 362 for each selected object. The processed media will contain the particular replacement images corresponding to each selected common object. The list of objects and the files corresponding to the objects may be stored in one or more network devices.

The image file option 360 allows the user to select one or more image files available to the user. The image files may be located on a device associated with the user that is accessible to the playback device so that the file can be transmitted to the network computing device that is to create the processed media content along with the request. The image files may include images of particular people or particular things that are likely to appear in the media content that is to be recorded.

The replacement option 362 may designate how a selected image is to be altered. Selecting an arrow of the replacement option 362 may present different options for the image that is to replace the selected object. The selection of the replacement option 362 may indicate a process to be applied to the selected object (e.g., blur, blank box, fill, or other option) or a file provided by the user that identifies a substitute object for the selected image. The file may include information that allows the network device that produces the processed media content to alter the substitute object to correspond to the selected object in frames of the video content where the selected object appears.

The user may choose to alter more than one object via the stock images option 358 and the image file option 360. When more than one object is chosen for alteration, the replacement option 362 may be provided for each chosen object.

The user interface 300 may include a tag select objects option 364. Selection of the tag select objects option 364 may cause the user interface 300 to present and make accessible a stock images option 366 and an image file option 368. One or more objects to be tagged may be selected using the stock images option 366 and the image file option 368. Selection of the tag select objects option 364 causes a tag to be placed in the processed media content at each location where a selected object occurs. The tags that identify the selected objects may be used during playback of the processed media content to go to portions of interest in the processed media content.

The user interface 300 may also include a tag scene transitions option 370. Selection of the tag scene transitions option 370 causes the processed media content to contain a tag at each scene transition. The scene transition tags may be used during playback of the processed media content to go to portions of interest in the processed media content.

After the user has entered all information in the user interface 300, the user may select a submit button 372. Selection of the submit button 372 may cause the request to be sent to the network device that will create the processed media content.

A network computing device may provide facilities and interfaces for users to select media content for recordation from a public network (e.g., the Internet). The users may select options for generating processed media content from the media content. The options may include adding forward error correction, transcoding the media content for playback on one or more playback devices, selection of a particular resolution for playback, altering an audio portion of the media content, altering a video portion of the media content, tagging of words and word phrases, tagging of objects, or combinations thereof. The processed media content may include error correction data, may be in a format for playback on a selected playback device, may have a desired resolution during playback on the selected playback device, may include tags at locations of selected words or word phrases in the audio portion of the processed media content, may include tags at locations of selected objects in the video portion of the processed media content, my include tags at scene transitions, may alter the audio portion of the media content, may alter the video portion of the media content, or combinations thereof. The user selectable options may allow for an improved quality of experience when viewing the processed media content. The processed media content may include advertising placed in the processed media content by a service provider. The advertisement may be related to a subject of the media content or to products mentioned, shown or otherwise related to the media content. The processed media content may promote learning when the media content is a lecture, seminar, business meeting, or the like by providing the user with the ability to quickly and efficiently locate areas of interest in the processed media content.

Figure 4:
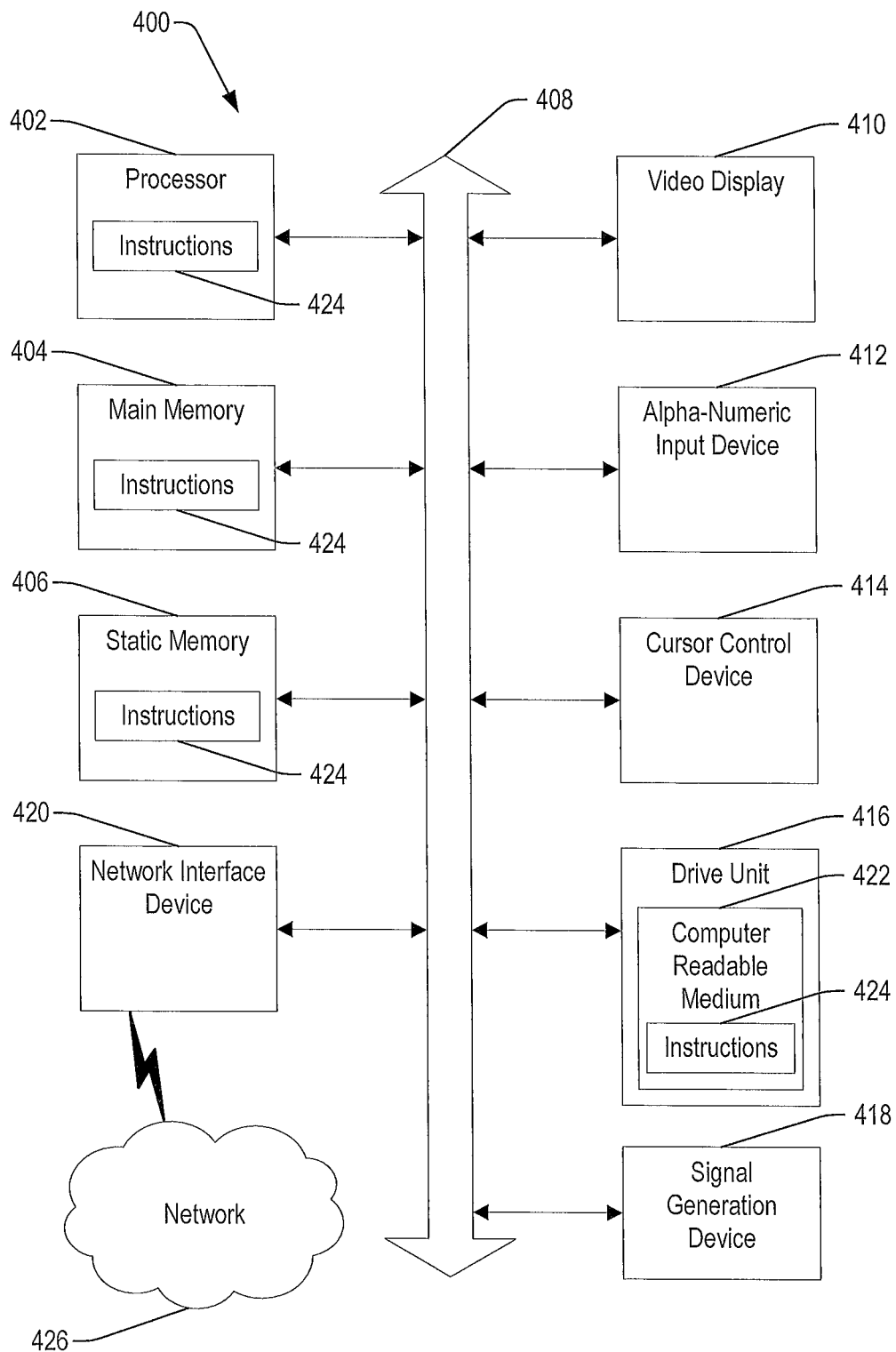
FIG. 4 is a block diagram of an illustrative embodiment of a general computer system.

Referring to FIG. 4, an illustrative embodiment of a general computer system is shown and is designated 400. The computer system 400 may include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. For example, the computer system 400 may include or be included within any one or more of the network computing device 102, the media source 108, the playback device 112, the media device 114, the computer system 116, the mobile communication device 118, the display device 124, and the remote control device 128 described with reference to FIG. 1.

In a networked deployment, the computer system 400 may operate in the capacity of a server or as a client user computer in a server-client user network environment, or as a peer computer system in a peer-to-peer (or distributed) network environment. The computer system 400 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a web appliance, or any other machine capable of executing a set of instructions (sequential or otherwise) that specify actions to be taken by that machine. In a particular embodiment, the computer system 400 may be implemented using electronic devices that provide video, audio, or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. Moreover, the computer system 400 may include a main memory 404 and a static memory 406, which can communicate with each other via a bus 408. As shown, the computer system 400 may further include a video display unit 410, such as a liquid crystal display (LCD), a projection television system, a flat panel display, or a solid state display. Additionally, the computer system 400 may include an input device 412, such as a keyboard, and a cursor control device 414, such as a mouse. The computer system 400 may also include a disk drive unit 416, a signal generation device 418, such as a speaker or remote control, and a network interface device 420. Some computer systems 400 may not include an input device (e.g., a server may not include an input device).

In a particular embodiment, as depicted in FIG. 4, the disk drive unit 416 may include a computer-readable non-transitory storage medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable non-transitory storage media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by the computer system 400. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable non-transitory storage medium that stores instructions 424 or receives, stores and executes instructions 424 responsive to a propagated signal, so that a device connected to a network 426 may communicate voice, video or data over the network 426. Further, the instructions 424 may be transmitted or received over the network 426 via the network interface device 420.

While the computer-readable non-transitory storage medium is shown to be a single medium, the term "computer-readable non-transitory medium" includes a single medium or multiple media, such as a centralized or distributed database, and/or associated caches and servers that store one or more sets of instructions. The term "computer-readable non-transitory medium" shall also include any medium that is capable of storing instructions for execution by a processor or that cause a computer system to perform any one or more of the methods or operations disclosed herein.

In a particular non-limiting, exemplary embodiment, the computer-readable non-transitory storage medium may include a solid-state memory such as a memory card or other package that houses one or more non-volatile read-only memories. Further, the computer-readable non-transitory storage medium may be a random access memory or other volatile re-writable memory. Additionally, the computer-readable non-transitory storage medium may include a magneto-optical or optical medium, such as a disk or tapes or other storage device. Accordingly, the disclosure is considered to include any one or more of a computer-readable non-transitory storage medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP, IEEE 802.x) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, at a network computing device, a recording request to generate processed media content from media content, wherein the recording request includes settings, wherein the settings indicate to tag a particular object associated with the media content, wherein the settings identify an image file that depicts the particular object, wherein the settings comprise a selected resolution of the processed media content, and wherein at least a portion of the settings are automatically determined based on the selected resolution; and after receiving the media content at the network computing device via a network, generating the processed media content by:
  searching the media content for an occurrence of the particular object;
  identifying the particular object in multiple frames of the media content based on the image file;
  tagging the particular object in the multiple frames of the media content; and
sending the processed media content via the network to a memory device,
wherein the settings are received via an interface including an option to add forward error correction to the processed media content, wherein the option to add forward error correction is automatically selected based on the selected resolution, the selected resolution being selected in accordance with a type of device for presenting the processed media content.

2. The method of claim 1, further comprising receiving the media content from a media source at a scheduled time based on the settings of the recording request.

3. The method of claim 1, wherein the settings indicate to identify a particular word in the media content, and further comprising, after the receiving the media content, generating an indication associated with the particular word, wherein the processed media content includes the indication.

4. The method of claim 1, wherein the settings include an identifier of a stock image and a request to replace the particular object with the stock image.

5. The method of claim 1, wherein the settings identify a file for a substitute image that is to replace the particular object, and wherein the file includes information to enable the network computing device to compensate for scale changes, rotation changes, perspective changes, or a combination thereof.

6. The method of claim 1, wherein the settings indicate to replace the particular object with a blurred version of the particular object.

7. The method of claim 1, wherein the generating the processed media content includes adding a password protection to the processed media content responsive to the settings indicating a password for the processed media content, the password protection requiring entry of the password to initiate playback of the processed media content.

8. The method of claim 1, wherein the settings include a playback resolution for the processed media content.

9. The method of claim 1, wherein the settings include access credentials for downloading the processed media content from the network computing device, and further comprising receiving the access credentials at the network computing device before the sending the processed media content to the memory device.

10. A system comprising:
an interface;
a processor coupled to the interface and configured to receive, via the interface, a recording request to generate processed media content from media content, wherein the recording request includes settings, wherein the settings indicate to tag a particular object, wherein the settings identify an image file that depicts the particular object, wherein the settings identify a storage location for the processed media content, wherein the settings comprise a selected resolution of the processed media content, and wherein at least a portion of the settings are automatically determined based on the selected resolution; and a memory accessible to the processor, wherein the memory includes instructions executable by the processor to perform operations, the operations including:
  searching the media content for an occurrence of the particular object;
  identifying the particular object in multiple frames of the media content;
  tagging the particular object in the multiple frames of the media content; and
  storing the processed media content at the storage location,
wherein the interface includes an option to add forward error correction to the processed media content, wherein the option to add forward error correction is automatically selected based on the selected resolution, the selected resolution being selected in accordance with a type of device for presenting the processed media content.

11. The system of claim 10, wherein the operations further include replacing a particular word in the media content with substitute audio, the substitute audio in the processed media content, the particular word and the substitute audio identified in the settings.

12. The system of claim 11, wherein the substitute audio comprises a beep.

13. The system of claim 11, wherein the settings identify an audio file, the audio file comprising the substitute audio.

14. The system of claim 10, wherein the settings indicate to tag a scene change in the media content.

15. A computer-readable storage device storing executable instructions that, when executed by a processor, cause the processor to perform operations, the operations comprising:
  receiving, from a user device, a recording request to generate processed media content from media content, wherein the recording request includes settings, wherein the settings comprise a selected resolution of the processed media content, and wherein at least a portion of the settings are automatically determined based on the selected resolution;
  after receiving the media content via a network, generating the processed media content by searching the media content for an occurrence of an object depicted in an image file identified in the settings, identifying the object in multiple frames of the media content based on the image file, and tagging the object in the multiple frames of the media content; and
  sending the processed media content to a memory device for storage, wherein the memory device and a name associated with the processed media content are identified in the settings,
wherein the settings are received via an interface including an option to add forward error correction to the processed media content, wherein the option to add forward error correction is automatically selected based on the selected resolution, the selected resolution being selected in accordance with a type of device for presenting the media content.

16. The computer-readable storage device of claim 15, wherein the generating the processed media content includes adding a password protection to the processed media content responsive to the settings.

17. The computer-readable storage device of claim 16, wherein the password protection requires entry of a password to initiate playback of the processed media content.

18. The computer-readable storage device of claim 15, wherein the settings are received via an interface, and wherein the interface includes an option to add closed captioning of an audio stream to the processed media content.

19. The computer-readable storage device of claim 15, wherein the settings indicate to tag locations of a particular object associated with the media content.

20. The computer-readable storage device of claim 15, wherein the settings indicate to tag locations of a particular word in an audio stream of the media content, and wherein the settings identify the particular word.

* * * * *